(12) United States Patent
Engerman

(10) Patent No.: US 12,584,547 B2
(45) Date of Patent: Mar. 24, 2026

(54) MULTI-SPEED ELECTRIC AXLE

(71) Applicant: Dana Automotive Systems Group, LLC, Maumee, OH (US)

(72) Inventor: Eric M. Engerman, Plymouth, MI (US)

(73) Assignee: DANA AUTOMOTIVE SYSTEMS GROUP, LLC, Maumee, OH (US)

(*) Notice: Subject to any disclaimer, the term of this patent is extended or adjusted under 35 U.S.C. 154(b) by 0 days.

(21) Appl. No.: 18/828,505

(22) Filed: Sep. 9, 2024

(65) Prior Publication Data

US 2025/0102049 A1 Mar. 27, 2025

Related U.S. Application Data

(60) Provisional application No. 63/584,596, filed on Sep. 22, 2023.

(51) Int. Cl.
| | |
|---|---|
| *F16H 37/08* | (2006.01) |
| *B60K 1/00* | (2006.01) |
| *B60K 6/365* | (2007.10) |
| *B60K 6/40* | (2007.10) |
| *B60K 6/547* | (2007.10) |
| *B60K 17/08* | (2006.01) |

(52) U.S. Cl.
CPC ............. *F16H 37/082* (2013.01); *B60K 1/00* (2013.01); *B60K 6/365* (2013.01); *B60K 6/40* (2013.01); *B60K 6/547* (2013.01); *B60K 17/08* (2013.01); *B60K 2001/001* (2013.01); *B60Y 2200/92* (2013.01); *F16H 2200/0021*

(2013.01); *F16H 2200/0034* (2013.01); *F16H 2200/2007* (2013.01); *F16H 2200/2035* (2013.01)

(58) Field of Classification Search
CPC ........... F16H 37/082; F16H 2200/0021; F16H 2200/0034; F16H 2200/2007; F16H 2200/2035; F16H 2200/2005; F16H 3/54; F16H 48/22; B60K 1/00; B60K 2001/001; B60K 6/365; B60K 17/08; B60Y 2200/92; B60Y 2200/91
See application file for complete search history.

(56) References Cited

U.S. PATENT DOCUMENTS

| | | | | |
|---|---|---|---|---|
| 8,663,051 | B2* | 3/2014 | Sten | F16H 48/36 475/221 |
| 9,062,744 | B2* | 6/2015 | Valente | G01N 30/8624 |
| 11,739,815 | B2* | 8/2023 | Sten | F16H 3/54 475/5 |
| 11,761,521 | B2* | 9/2023 | Wechs | B60K 17/08 475/150 |
| 2009/0038866 | A1* | 2/2009 | Abe | F16H 48/36 180/65.7 |
| 2013/0203543 | A1* | 8/2013 | Sten | F16H 48/36 475/150 |

(Continued)

*Primary Examiner* — Farhana Pervin
(74) *Attorney, Agent, or Firm* — McCoy Russell LLP

(57) ABSTRACT

A system and method for a multi-speed electric axle. The multi-speed electric axle includes, in one example, an electric machine rotationally coupled to an input shaft, a planetary gear set including a ring gear meshed with a gear fixedly coupled to the input shaft and a carrier that is rotationally coupled to a shaft, a first clutch configured to selectively ground a sun gear in the first planetary gear set, and a second clutch configured to selectively rotationally couple a sun gear in the planetary gear set with the shaft.

7 Claims, 10 Drawing Sheets

(56) References Cited

U.S. PATENT DOCUMENTS

| 2018/0194214 | A1* | 7/2018 | Oba | B60K 6/445 |
| 2019/0383373 | A1* | 12/2019 | Engerman | F16H 37/082 |
| 2020/0096084 | A1* | 3/2020 | Engerman | F16H 3/006 |
| 2021/0254686 | A1* | 8/2021 | Engerman | F16H 48/06 |
| 2021/0347253 | A1* | 11/2021 | Seemann | B60K 1/00 |
| 2021/0354542 | A1* | 11/2021 | Schleif | B60K 17/00 |

* cited by examiner

300

EM 128  130  122  302 y
z ⊙ → x

MULTI-SPEED ELECTRIC AXLE

CROSS-REFERENCE TO RELATED APPLICATION

The present application claims priority to U.S. Provisional Application No. 63/584,596, entitled "MULTI-SPEED ELECTRIC AXLE", and filed on Sep. 22, 2023. The entire contents of the above-listed application are hereby incorporated by reference for all purposes.

TECHNICAL FIELD

The present disclosure relates to a multi-speed electric axle with a space efficient architecture.

BACKGROUND AND SUMMARY

Segments of the vehicle market are moving towards electrification. Some vehicle platforms demand relatively large wheel torques to achieve towing and payload targets. As the weight of the electric vehicle (EV) increases, due to the added mass from the traction batteries for instance, the motor torque and power demands increase substantially when compared to vehicles that solely rely on internal combustion engines for motive power and have similar packaging constraints. Further, powershifting is desired in certain powertrains, such as rear wheel drive powertrains. Further, achieving a comparatively high range and efficiency, especially when towing, may be wanted in many types of EVs. To meet these range and efficiency targets some powertrains employ engines to run generators which power the electrical branch of the powertrain during towing. However, the engines may impose spatial and thermal constraints, in some cases, on the electrical components in the powertrain.

The inventors have recognized the abovementioned challenges and developed an electric axle to at least partially overcome the challenges. The multi-speed electric axle includes, in one example, an electric machine rotationally coupled to an input shaft and a planetary gear set. The planetary gear set includes a ring gear meshed with a gear fixedly coupled to the input shaft and a carrier that is rotationally coupled to a shaft, a first clutch configured to selectively ground a sun gear in the first planetary gear set, and a second clutch configured to selectively rotationally couple a sun gear in the planetary gear set with the shaft. In this way, the multi-speed electric axle is able to achieve multiple operating gears suited for high and low range operation with increased compactness and efficiency.

In one example, the shaft may be coupled to a differential via a second planetary gear set. Further, in such an example, the electric axle may further include a jumper shaft that is rotationally coupled to the shaft and the second planetary gear set. The jumper shaft may also and extend across a side of the electric machine. In this way, the electric axle may be packaged in a wider variety of vehicle platforms such as hybrid vehicles with exhaust systems that run next to the electric axle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
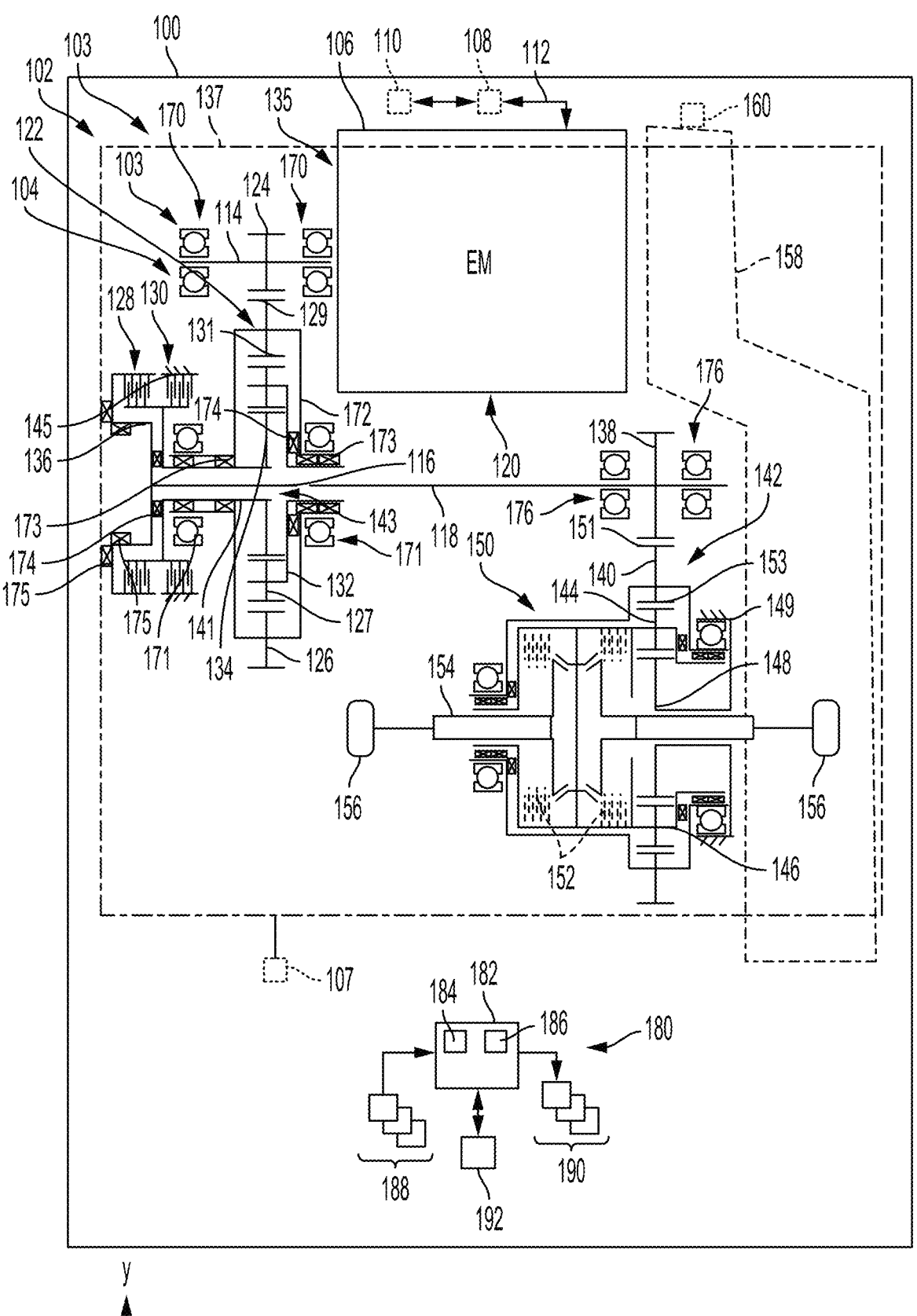
FIG. 1 shows a schematic depiction of a first example of an electric axle in a vehicle.

FIG. 1 shows an electric vehicle (EV) 100 that includes a powertrain 102 with an electric axle assembly 103 with a multi-speed electric axle 104 (e.g., a rear electric axle) which may be formed as an assembly. As such, The EV 100 is a hybrid EV in the illustrated example. In the rear axle example, the front axle may be a steerable axle and may be driven by an internal combustion engine (ICE). However, in other examples, the ICE may be configured to charge a traction battery and/or other suitable energy storage device when the electric axle is a rear electric axle. Even further, in other examples, the EV 100 may be an all-electric vehicle (e.g., battery electric vehicle (BEV)).

As described herein an electric axle is an electric drive incorporated into an axle. The electric axle may be an electric beam axle, in one example. A beam axle is an axle with mechanical components structurally supporting one another and extending between drive wheels. For instance, the beam axle may be a structurally continuous structure that spans the drive wheels on a lateral axis, in one embodiment. Thus, wheels coupled to the beam axle substantially move in unison when articulating, during, for example, vehicle travel on uneven road surfaces. To elaborate, the camber angle of the wheels may remain substantially constant as the suspension moves through its travel. The beam axle may be coupled to a dependent suspension system 107, in one example. Therefore, the electric axle may be an unsprung mass.

The multi-speed electric axle 104 includes an electric machine 106 (e.g., a traction motor). The electric machine 106 may be an electric motor-generator, for example. For instance, the electric machine 106 may be designed as a multi-phase alternating current (AC) motor-generator. However, in other examples, the electric machine may be a motor without generator capabilities.

As illustrated in FIG. 1, the electric machine 106 may be electrically coupled to an inverter 108. The inverter 108 is designed to convert direct current (DC) electric power to alternating current (AC) electric power and vice versa. Therefore, the electric machine 106 may be an AC electric machine, as previously indicated. However, in other examples, the electric machine may be a DC electric machine and the inverter may therefore be omitted from the electric drive, in such an example. The inverter 108 may receive electric energy from one or more energy storage device(s) 110 (e.g., traction batteries, capacitors, combinations thereof, and the like). Arrows 112 signify the electric energy transfer between the electric machine 106, the inverter 108, and the energy storage device(s) 110 that may occur during different modes of electric axle operation (e.g., a drive mode and a regeneration mode). As such, during a drive mode, electric energy may flow from the energy storage device(s) 110 to the electric machine 106 and during a regenerative mode, electric energy may flow in the opposite direction from the electric machine to the energy storage device(s).

The multi-speed electric axle 104 further includes an input shaft 114 and a shaft 116. The shaft 116 may be coupled to or formed with a jumper shaft 118 which extends across a side 120 of the electric machine 106, in the illustrated example. In the illustrated example, the jumper shaft 118 is arranged coaxial to and rotationally coupled to the shaft 116 In this way, axle compactness is increased. Further, the axial length of the jumper shaft 118 may be longer than the shaft 116 and/or the input shaft 114. However, other electric axle architectures have been contemplated.

A planetary gear set 122 is rotationally coupled to the input shaft 114 via a mesh between a gear 124 (fixedly coupled to or formed with the input shaft) and a ring gear 126 in the planetary gear set. The ring gear 126 includes outer teeth that mesh with gear 124 and inner teeth that mesh with planet gears 127 in the planetary gear set 122. As such, the ring gear 126 includes outer teeth 129 that mesh with teeth in the gear 124 and inner teeth 131 that mesh with teeth in the planet gears 127. Clutches 128 and 130 are configured to alter the power path through the planetary gear set 122.

The planetary gear set 122 further includes a carrier 132 on which the planet gears 127 rotate and a sun gear 134. The clutches 128 and 130 are illustrated as friction clutches (e.g., wet friction clutches) which increase the axle's compactness. In such an example, the friction clutches include interleaved plates that are supported via carriers (e.g., hubs, sleeves, and the like) or other suitable components. However, a one-way clutch (e.g., a sprag clutch) with a locking ring may be used to replace one or more of the clutches, which may however decrease axle compactness. The carrier 132 is rotationally coupled to the jumper shaft 118, in the illustrated example.

The clutch 128, when engaged, rotationally couples the sun gear 134 and the shaft 116 via a shaft 136 and/or other suitable components. A shaft 141 rotationally attached the sun gear 134 and the clutches 128 and 130, in the illustrated example. Additionally, the shaft 141 includes an interior opening 143 through which the shaft 116 extends. The clutch 130 when engaged grounds the sun gear 134 to a stationary component 145 such as an axle housing, a motor housing, and/or other suitable stationary component.

The clutch 130, when engaged, brakes the sun gear 134. Further, the carrier 132 in the planetary gear set 122 is rotationally coupled to the shaft 116 and/or the jumper shaft 118. The clutches 128 and 130 are arranged coaxial to one another, in the illustrated example, to increase axle compactness. However, other clutch layouts may be used in other examples, which may however decrease axle compactness.

The planetary gear set 122 and the clutches 128 and 130 may be conceptually included in a multi-speed gear train (e.g., a two-speed gear train). The multi-speed gear train may be positioned at a side 135 of the electric machine 106 to allow another planetary gear set 142, functioning as a final drive ratio, to be packed under an exhaust system 158. Further, the multi-speed gear train may be designed with solely one helical gear pair (e.g., the gear 124 and the gear 126) to increase system compactness and achieve packaging demands of certain vehicle platforms. An example package boundary is indicated at 137.

In the illustrated example, a gear 138 is fixedly coupled to the jumper shaft 118. However, the axle may exhibit other layouts where the jumper shaft may be omitted in other examples. The gear 138 may mesh with a ring gear 140 in the planetary gear set 142. The planetary gear set 142 functions as a final drive ratio and achieves increased compactness. However, other types of final drive ratios may be used in other examples which may however decrease axle compactness.

The planetary gear set 122 and the planetary gear set 142 are depicted as simple planetary gear sets in the illustrated example. In this way, axle compactness is increased. A simple planetary gear set is a planetary gear set that solely includes a ring gear, a set of planet gears, a carrier, and a sun gear.

The planetary gear set 142, in the illustrated example, includes planet gears 144 that rotate on a carrier 146 and a sun gear 148. The sun gear 148 may be grounded by a stationary component 149. The ring gear 140 includes outer teeth 151 that mesh with the gear 138 and inner teeth 153 that mesh with the planet gears 144 in the illustrated example. However, other planetary gear set configurations have been envisioned. Further, the carrier 146 may be rotationally coupled to a differential 150. In this way, the planetary gear set 142 may achieve a desired gear ratio. The differential 150 is a limited slip differential with clutches 152, in the illustrated example. The clutches 152 may be configured to constrain the speed differential between the axle shaft to increase axle performance. However, the differential 150 may be an open or locking differential, in other examples. The differential 150 is rotationally coupled to axle shafts 154 which are in turn rotationally coupled to drive wheels 156.

In one specific example, to carry increase torque for the same ring gear diameter, the final drive ratio (FDR) is embodied as the planetary gear set 142 but is set up such that the axle structure of other axles may be maintained (e.g., the omission of a clamshell bolt flange around the FDR ring gear) since it is efficiently packaged and achieves structural integrity targets. Further, the sun gear 148 may be used as an outer support of the differential and the FDR assembly bearings and may be rigidly mounted to the differential casing on a bearing cap, for instance.

The multi-speed electric axle 104 in the illustrated example is packaged inboard from the exhaust system 158 to increase the vehicle's space efficiency. The exhaust system 158 receives exhaust gas from an internal combustion engine 160 which may include cylinders, intake valves, exhaust valves, and the like which may be operated in conjunction with a generator to recharge the energy storage device(s) 110. For instance, the engine may provide rotational input to the electric machine 106 which may be operated as a generator. However, the engine may serve other functions in the powertrain in other examples.

The EV 100 may also include a control system 180 with a controller 182. The controller 182 includes a processor 184 and memory 186. The memory 186 holds instructions stored therein that when executed by the processor 184 cause the controller 182 to perform the various methods, control techniques, etc., described herein. The processor 184 may include a microprocessor unit and/or other types of circuits. The memory 186 includes known data storage mediums such as random access memory, read only memory, keep alive memory, combinations thereof, and the like.

The controller 182 may receive various signals from sensors 188 positioned in different locations in the EV 100 and the multi-speed electric axle 104, more specifically. The sensors may include an electric machine speed sensor, energy storage device temperature sensor(s), clutch position sensors, an energy storage device state of charge sensor(s), wheel speed sensors, and the like. The controller 182 may also send control signals to various actuators 190 coupled at different locations in the EV 100, and the multi-speed electric axle 104. For instance, the controller 182 may send signals to the inverter 108 to adjust the rotational speed of the electric machine 106. The other controllable components in the vehicle and powertrain may function in a similar manner with regard to command signals and actuator adjustment. For instance, the controller 182 may send signals to the clutches 128 and 130 to engage and disengage the clutches to operate the axle in different range modes, which are expanded upon herein. The controller and control system shown in FIG. 1 may be used in the other electric axle examples described herein.

The EV 100 may also include one or more input device(s) 192 (e.g., an accelerator pedal, a brake pedal, a gear selector, a differential locker actuator, a console instrument panel, a touch interface, a touch panel, a keyboard, combinations thereof, and the like) in electronic communication with the controller 182. The input device(s) 192, responsive to operator input, may generate an acceleration adjustment request, a gear shift request, and the like.

An axis system is provided in FIG. 1 as well as FIGS. 2-12, for reference, when appropriate. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

The multi-speed electric axle 104 and the other electric axles described herein may implement a power shifting control strategy where one clutch is disengaged while the other clutch is engaged to reduce torque interruptions. A power shifting system is highly efficient in road operations since it results in zero meshing losses in the 2-speed planetary gear set and substantially reduces bearing losses.

Bearings are further illustrated in FIG. 1. As described herein a bearing may include an inner race, an outer race, and roller elements (e.g., spherical balls, cylindrical rollers, tapered rollers, and the like) therebetween or a bushing, for instance. Specifically, bearings 170 are coupled to opposing sides of the input shaft 114, in the illustrated example. Bearings 171 is coupled to an outer side of a shaft 172 that is coupled to the ring gear carrier 132, in the illustrated example. Bearing 173 and 174 may be coupled to an inner side of the shaft 172, in the illustrated example. The bearings 174 may specifically be thrust bearings, in one example. Further, bearings 175 are coupled to the shaft 136. Bearings 176 are further coupled to the jumper shaft 118, in the illustrated example.

Figure 2:
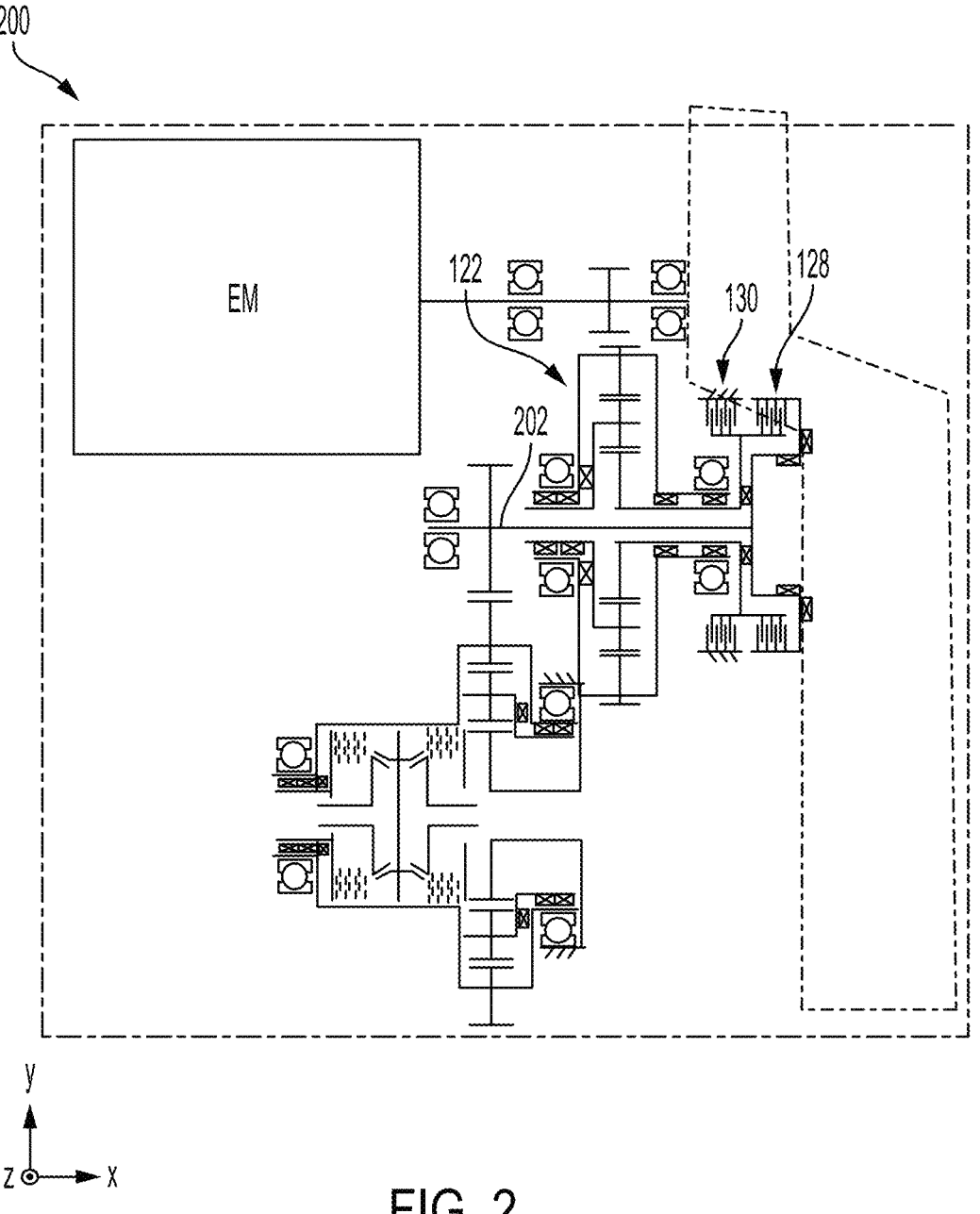
FIG. 2 shows a second example of an electric axle.
Figure 3:
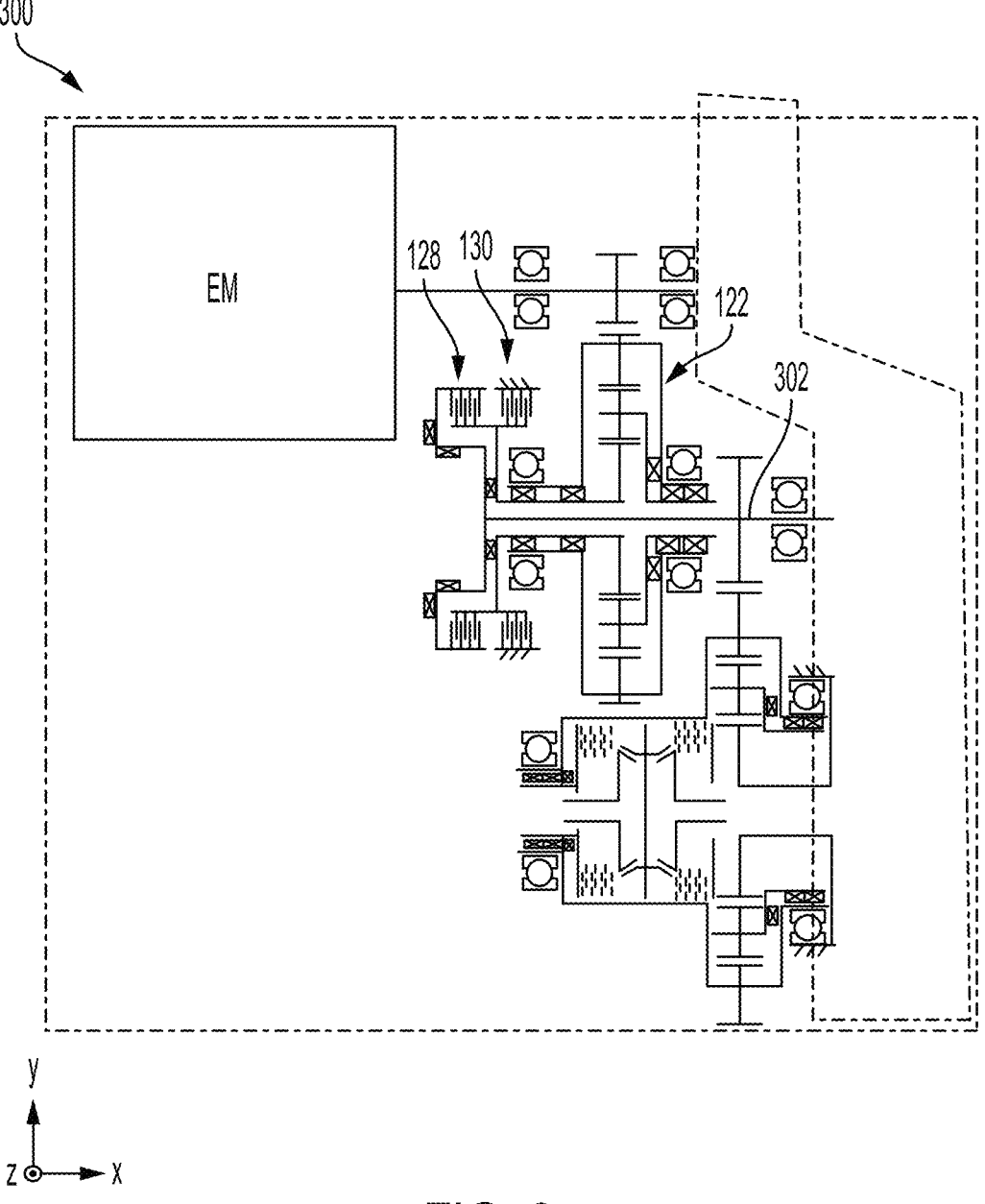
FIG. 3 shows a third example of an electric axle.

FIGS. 2 and 3 show different examples of multi-speed electric axles 200 and 300. The electric axles 200 and 300 include at least some overlapping components with the multi-speed electric axle 104, shown in FIG. 1 and redundant description of these components are omitted for brevity and similar components are similarly numbered. However, the layout of the components in the electric axles 104, 200, and 300 shown in FIGS. 1, 2, and 3 respectively varies. To elaborate, the electric axles 200 and 300 includes shafts 202 and 302, respectively, but do not include jumper shafts.

FIG. 2 specifically shows the multi-speed electric axle 200 with the clutches 128 and 130 positioned outboard of the planetary gear set 122 with regard to a lateral axis (e.g., the x-axis). FIG. 3 specifically shows the electric axle 300 with the clutches 128 and 130 positioned inboard from the planetary gear set 122 with regard to a lateral axis (e.g., the x-axis).

Figure 4:
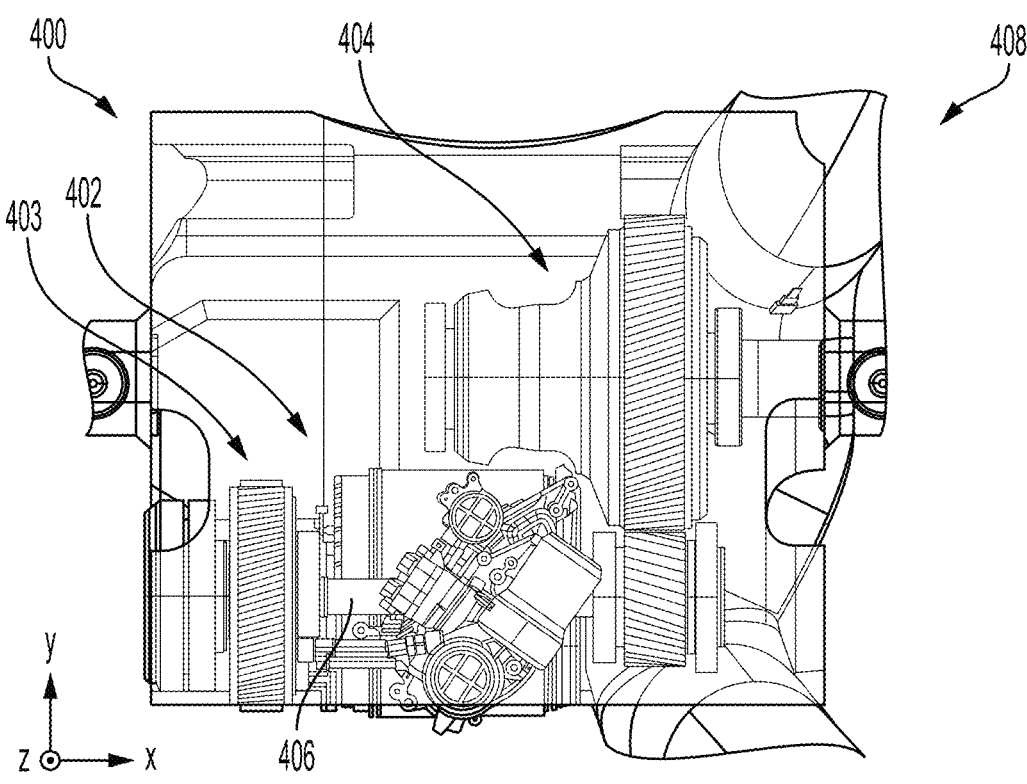
FIG. 4 shows a detailed example of an electric axle with the component architecture depicted in FIG. 1.

FIG. 4 shows a detailed illustration of a multi-speed electric axle 400 with the component architecture depicted in FIG. 1. The electric axle 400 in the illustrated embodiment includes an electric machine 402, a planetary gear set 403 with clutches, a differential 404, and a jumper shaft 406. Further, the electric axle is positioned inboard of an exhaust system 408. To elaborate, the differential 404 is positioned adjacent to the exhaust system 408, in the illustrated example.

Figure 5:
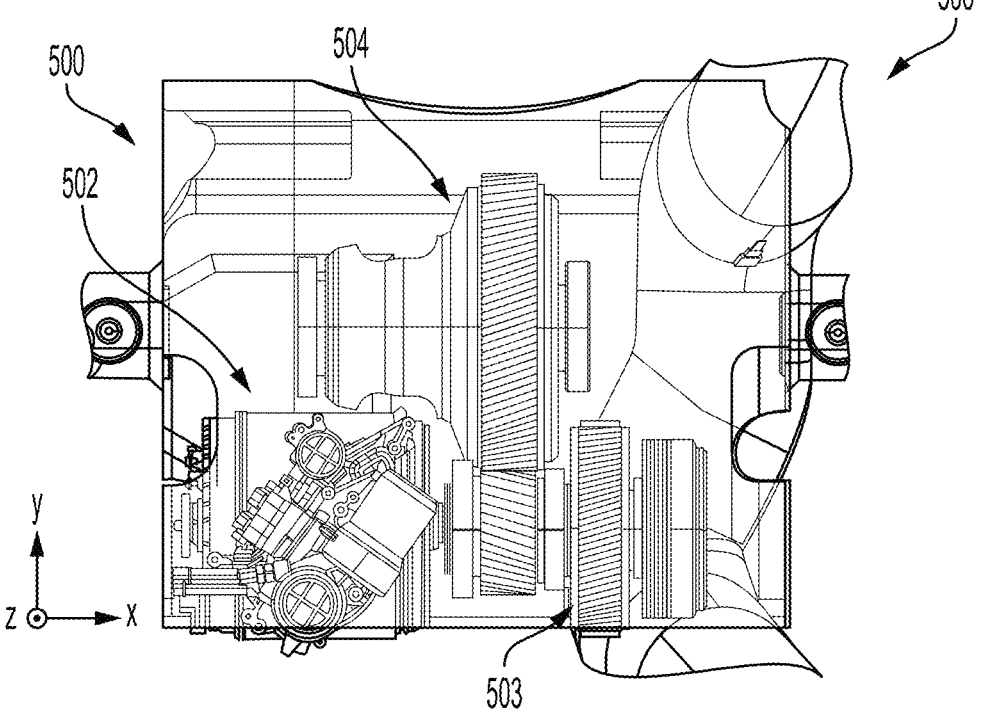
FIG. 5 shows a detailed example of an electric axle with the component architecture depicted in FIG. 2.

FIG. 5 shows a detailed illustration of a multi-speed electric axle 500 with the architecture depicted in FIG. 2. The multi-speed electric axle 500 in the illustrated embodiment includes an electric machine 502, a planetary gear set 503, and a differential 504. Further, the electric axle is positioned inboard of an exhaust system 506 and the planetary gear set 503 is specifically arranged adjacent to the exhaust system in the illustrated example.

Figure 6:
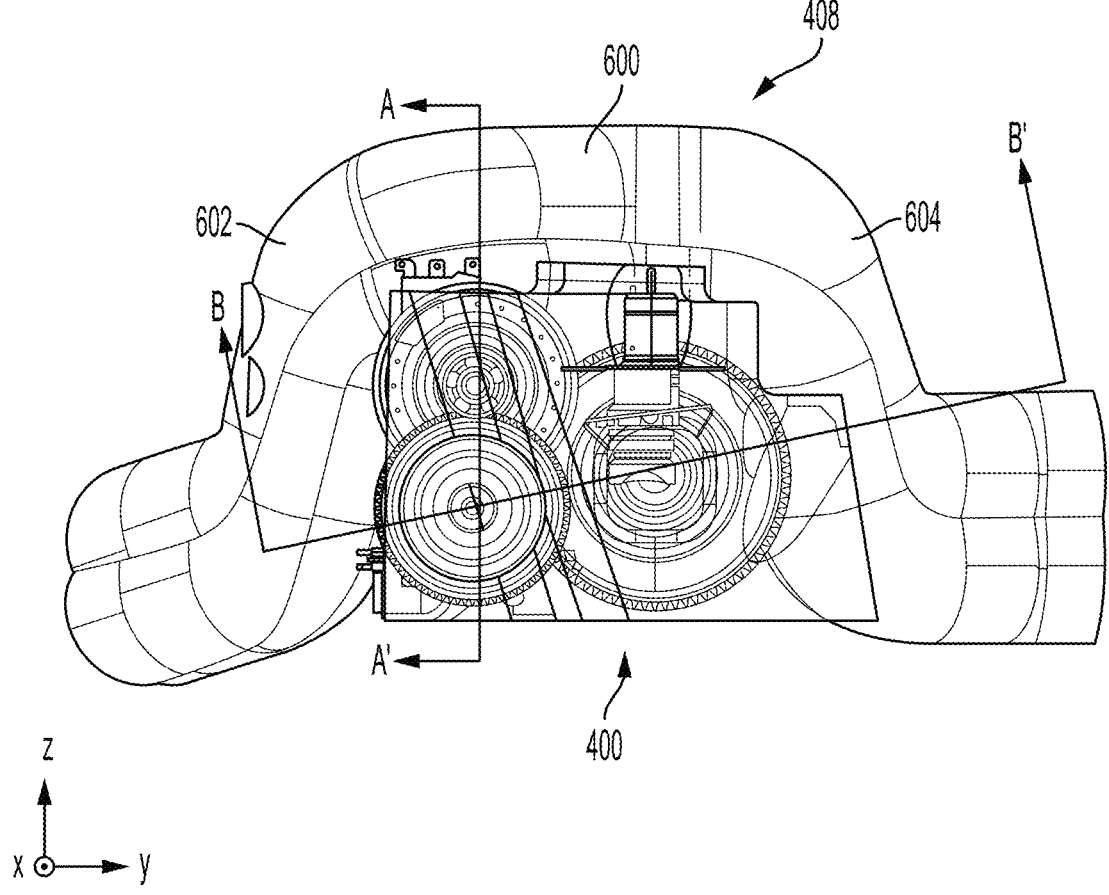
FIG. 6 shows another view of the electric axle depicted in FIG. 4.

FIG. 6 shows another view of the electric axle 400 and the exhaust system 408. Cutting plane A-A' indicates the cross-sectional view shown in FIG. 7 and cutting plane B-B' indicates the cross-sectional view shown in FIG. 8. The exhaust system 408 specifically includes an upper section 600 and side sections 602 and 604 which extend downward (e.g., downward at an angle) from the upper section, in the illustrated example. Further, in the illustrated example, the electric axle 400 is arranged below the upper section 600 and laterally between the side sections 602 and 604. In this way, the electric axle 400 is space efficiently packaged with regard to the exhaust system, thereby increasing the powertrain's space efficiency. However, the exhaust system and electric axle may have other arrangements, in alternate embodiments.

Figure 7:
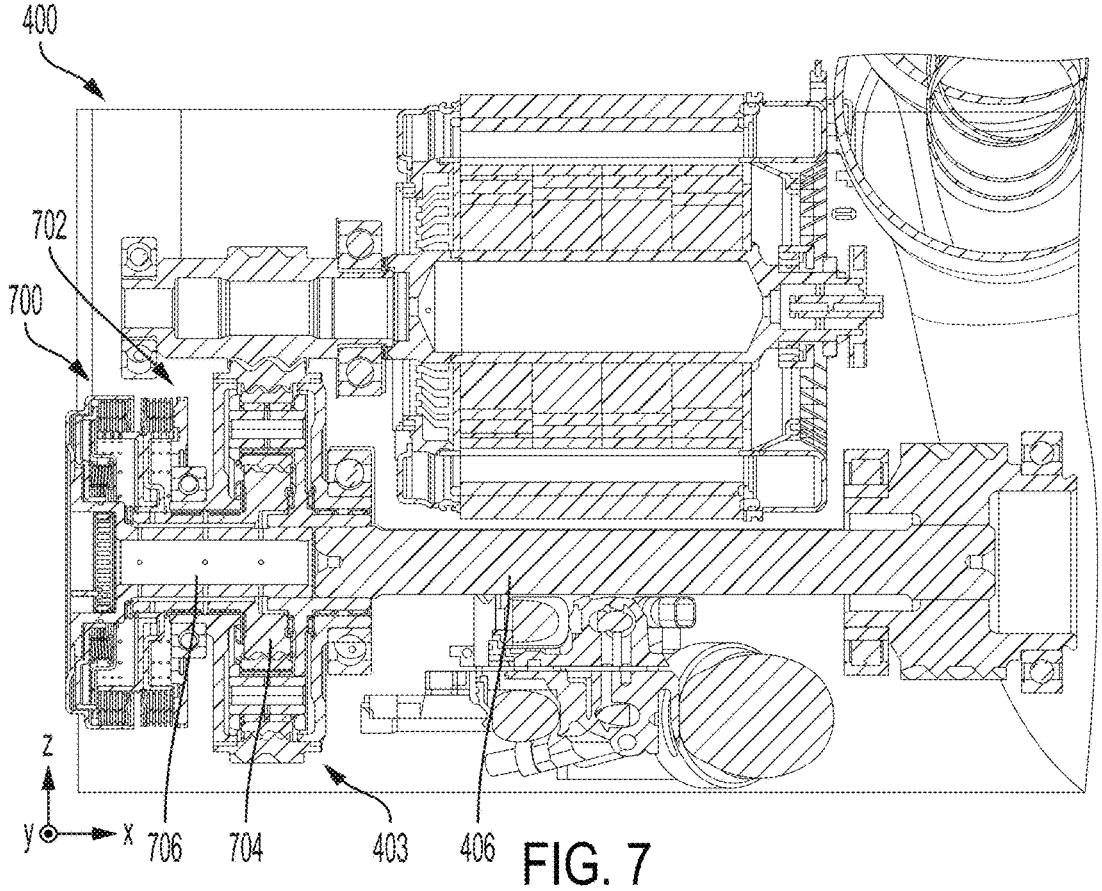
FIGS. 7-8 show cross-sectional views of the electric axle depicted in FIG. 4.
Figure 8:
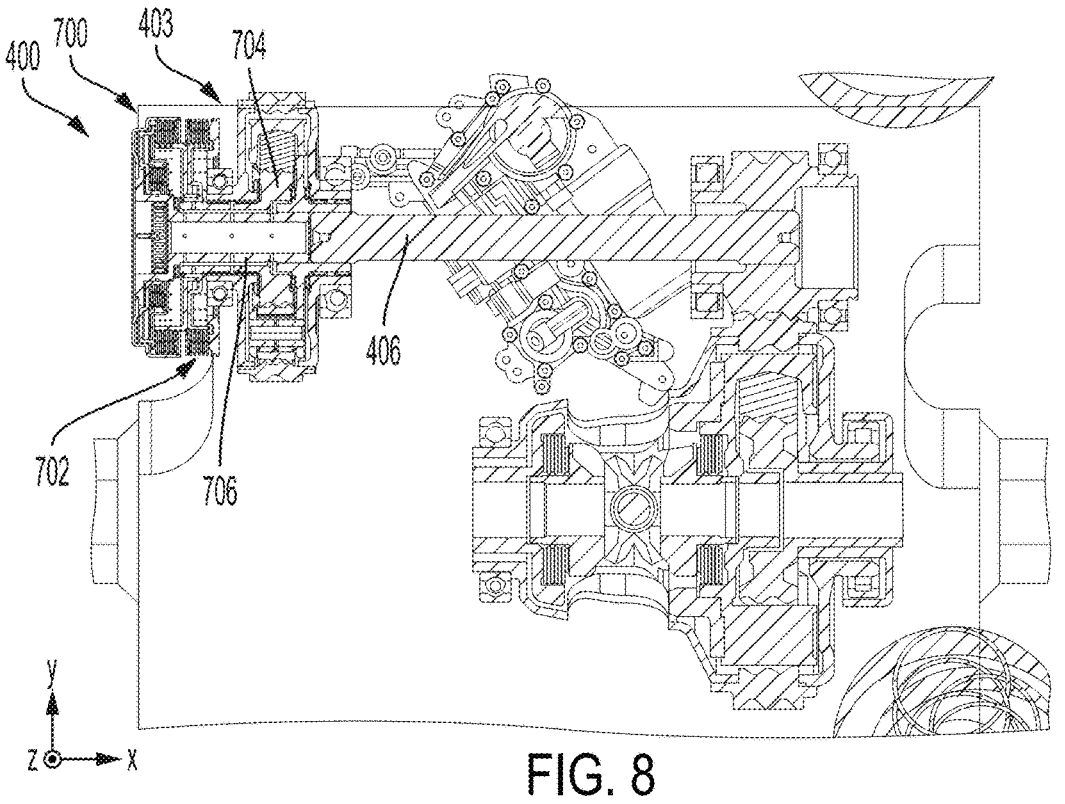

FIGS. 7-8 show clutches 700 and 702. The clutch 702, when engaged, brakes a sun gear 704 in the planetary gear set 403. The clutch 700, when engaged, rotationally couples a shaft 706 to the sun gear 704.

Figure 9:
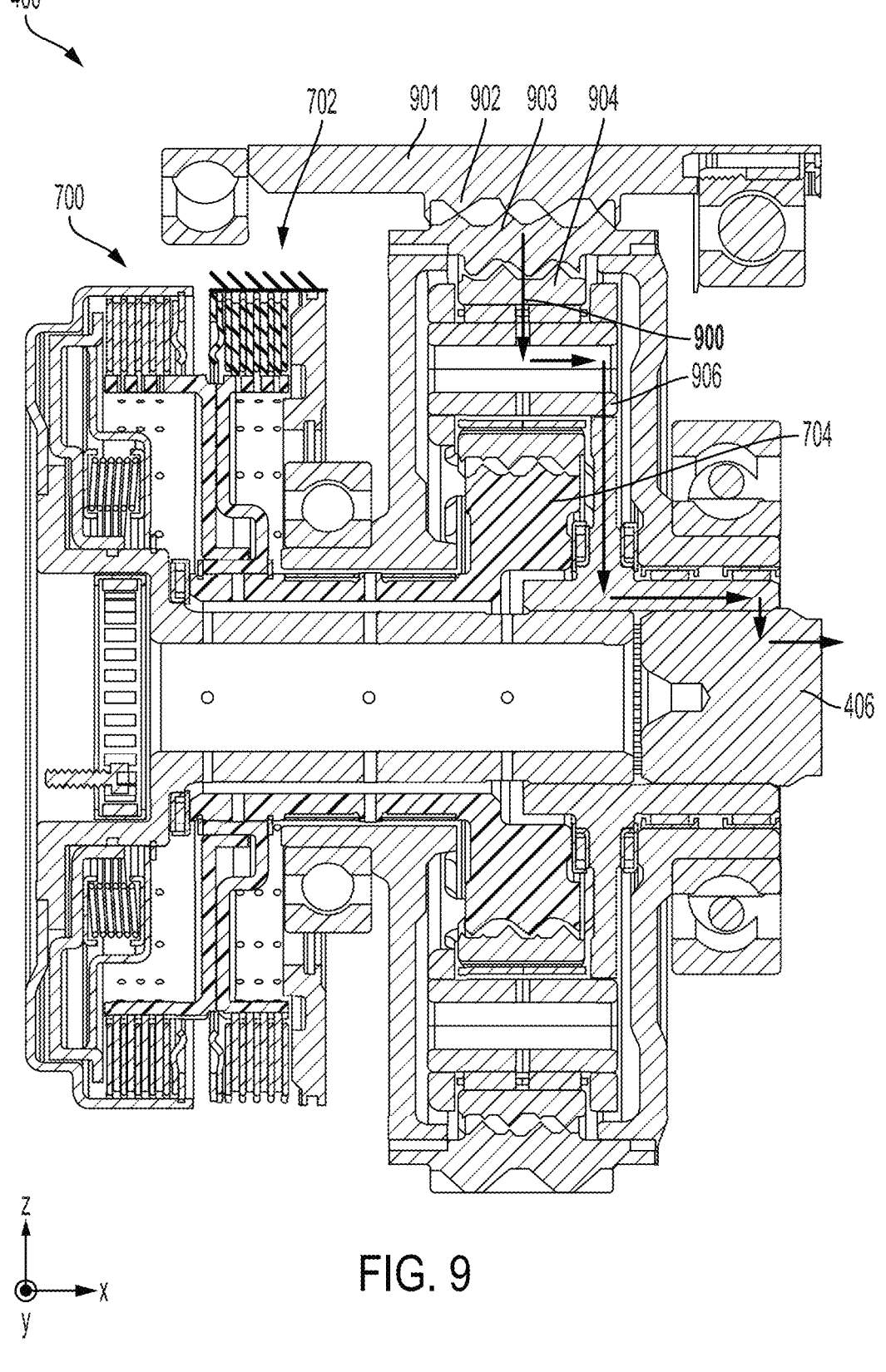
FIGS. 9-10 show power paths through the electric axle depicted in FIG. 4 in different gear modes.
Figure 10:
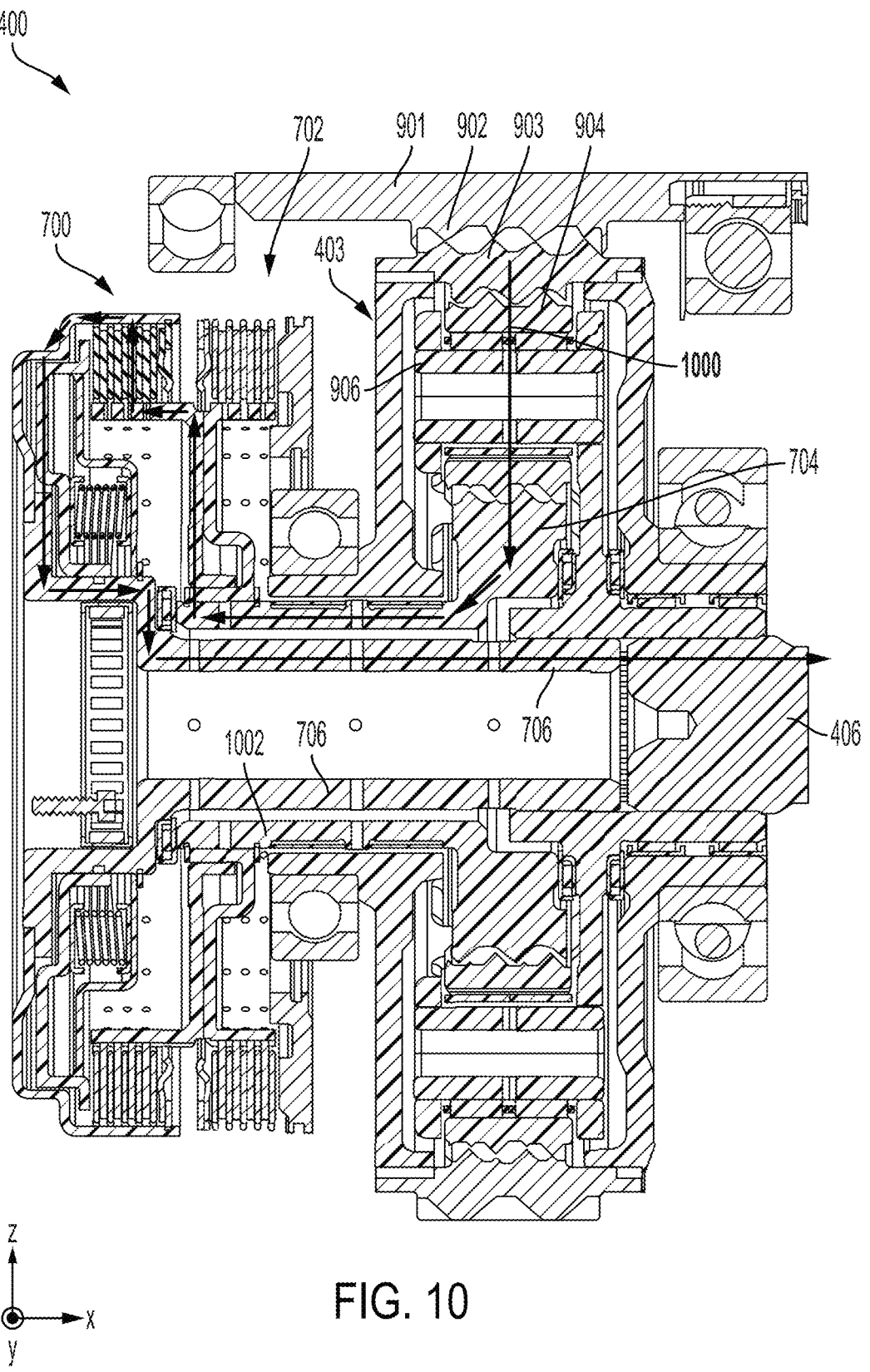

FIGS. 9 and 10 show the electric axle 400 operating in different gear modes. To elaborate, FIG. 9 shows the electric axle 400 operating in a lower gear mode and FIG. 10 conversely shows the electric axle operating in a higher gear mode. In one use-case example, the lower gear mode may be used for slower speed vehicle travel and the higher gear mode may be used for higher speed vehicle travel.

In the lower gear mode shown in FIG. 9, the clutch 700 is disengaged and the clutch 702 is engaged such that the sun gear 704 is held stationary. A mechanical power path 900 denotes the power flow through the axle in the lower gear mode is illustrated in FIG. 9. As shown, power travels from an input shaft 901 to a gear 902, from the gear 902 to a ring gear 903, from the ring gear 903 to planet gears 904, from the planet gears 904 to a carrier 906, from the carrier 906 to the jumper shaft 406, and from the jumper shaft 406 to downstream components (e.g., a second planetary gear set, a differential, axle shafts, etc.).

In the higher gear mode shown in FIG. 10, the clutch 702 is disengaged and the clutch 700 is engaged such that the sun gear 704 is rotationally coupled to the shaft 706. A mechanical power path 1000 denoting the power flow through the axle is illustrated in FIG. 10. As shown, power travels from an input shaft 901 to a gear 902, from the gear 902 to a ring gear 903, from the ring gear 903 to planet gears 904, from the planet gears 904 to a carrier 906, and from the carrier 906 to the sun gear 704, from the sun gear 704 to the clutch 700 vis the shaft 1002, from the clutch 700 to the shaft 706, from the shaft 706 to the jumper shaft 406, and from the jumper shaft 406 to downstream components (e.g., a second planetary gear set, a differential, axle shafts, etc.). It will be understood that in the power path 1000 power travels through all the gears and components in the planetary gear set 403 such that they rotate as one and through the clutch 700 and then power travels from the clutch 700 to the shaft 706. In this way, friction and windage losses in the planetary gear set are reduced during the higher gear mode, thereby increasing axle longevity.

Figure 11:
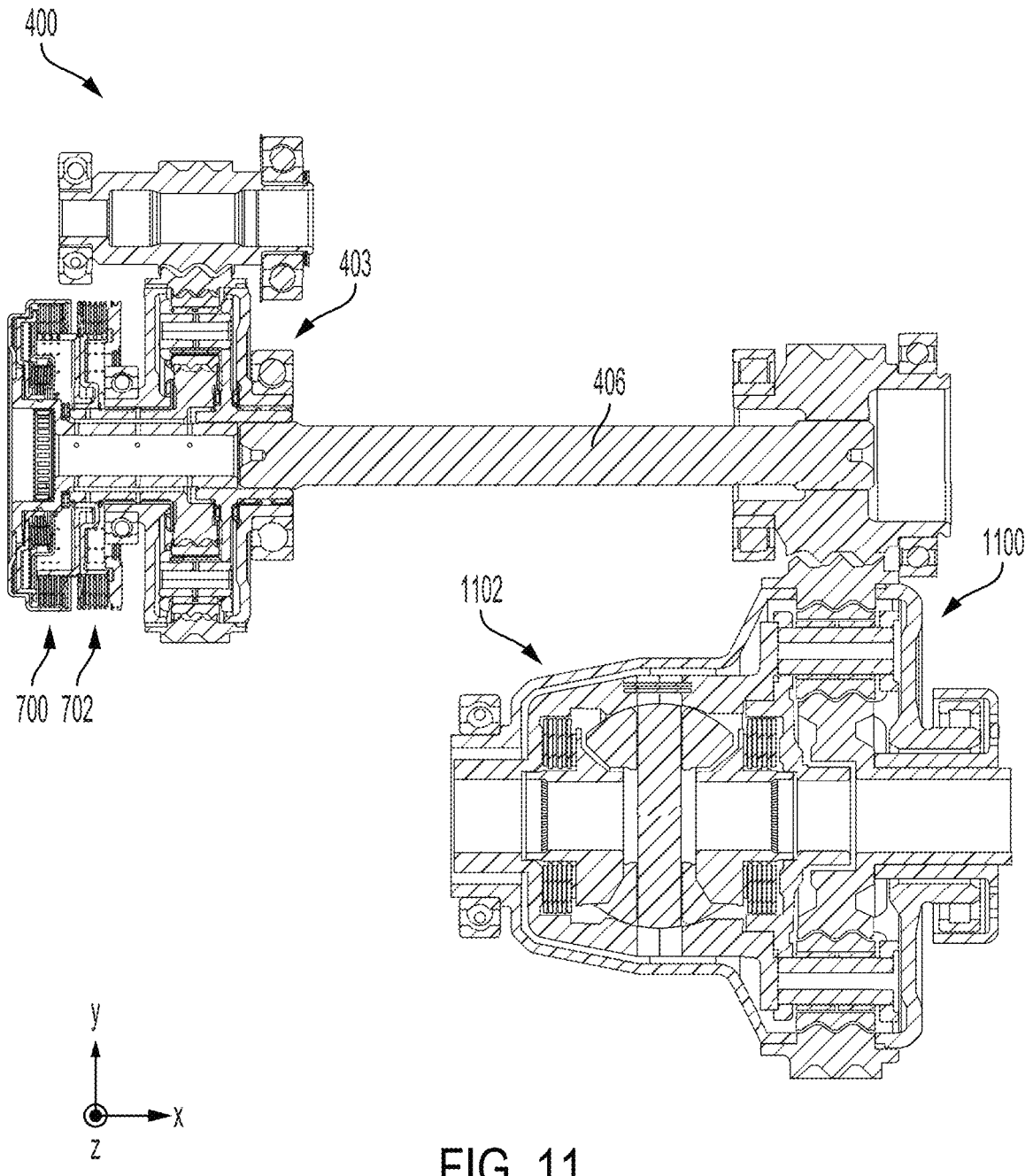
FIGS. 11-12 show additional cross-sectional views of the electric axle depicted in FIG. 4.

FIG. 11 shows another cross-sectional view of the electric axle 400 with the planetary gear set 403, the jumper shaft 406, another planetary gear set 1100 functioning as an FDR, and a differential 1102. The clutches 700 and 702 are again depicted in FIG. 11.

Figure 12:
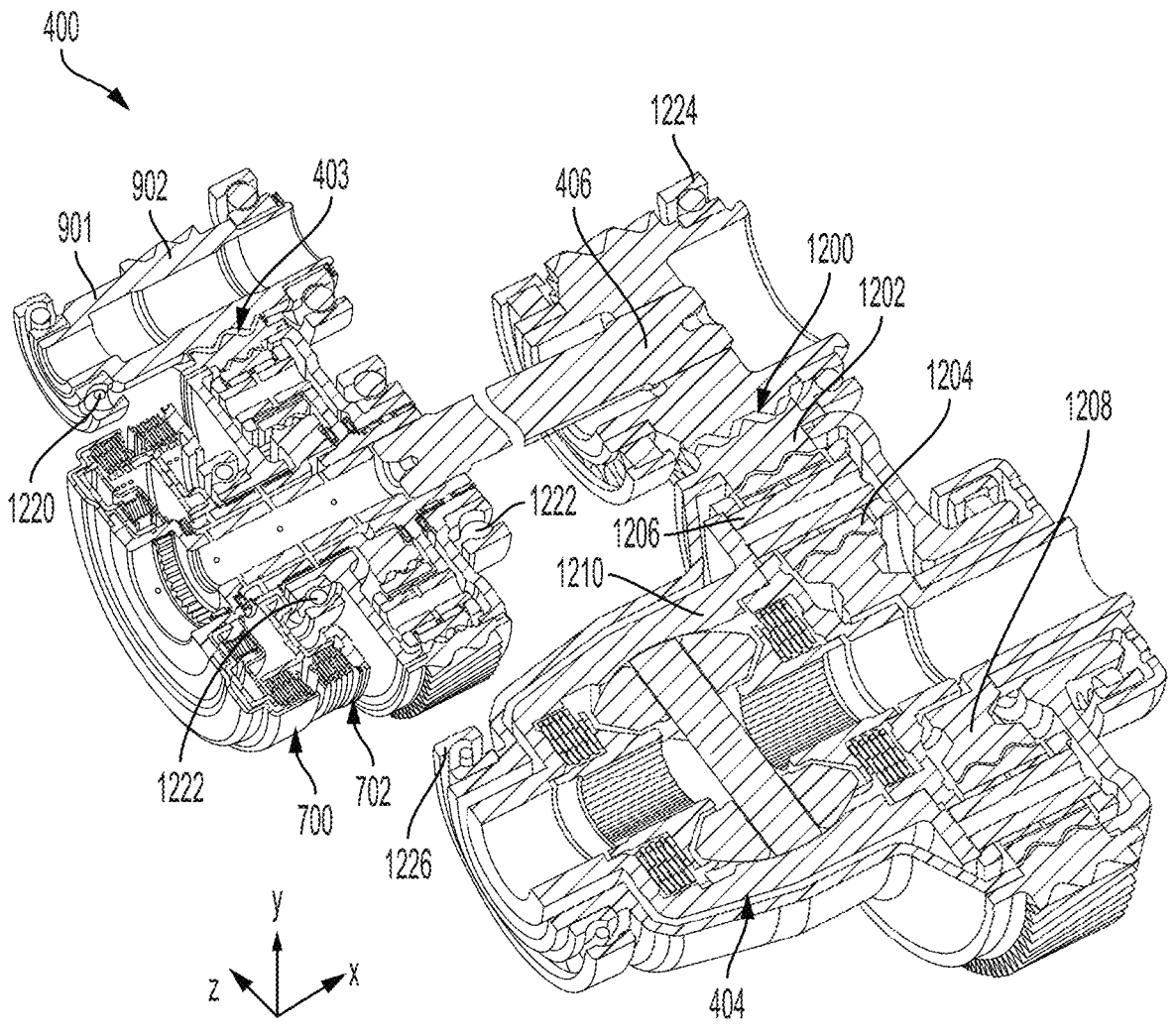

FIG. 12 shows an example of a bearing layout in the electric axle 400. Again, the input shaft 901, the gear 902, the planetary gear set 403, the clutches 700 and 702, the jumper shaft 406, another planetary gear set 1200, and the differential 404. The jumper shaft 406 is truncated in the illustrated example to allow the electric axle to be viewed in a more compact manner. The planetary gear set 1200 include a ring gear 1202, planet gears 1204 that are rotatably mounted on a carrier 1206, and a grounded sun gear 1208, in the illustrated example. The carrier 1206 is coupled to (e.g., directly coupled to) a case 1210 in the differential 404.

As shown in FIG. 12, bearing 1220 are coupled to the input shaft 901, bearings 1222 are coupled to the planetary gear set 403, bearings 1224 are coupled to the jumper shaft 406, and a bearing 1226 is coupled to the differential 404.

The electric axles described herein may achieve at least a 35% increase in torque in a similar radial package as other hyphoid gear axles but maintain a robust and strong axle structure. In this way, customer appeal is increased.

FIGS. 4-12 are drawn approximately to scale, aside from the schematically depicted components. However, the components may have alternate relative dimensions, in other embodiments.

FIGS. 1-12 show example configurations with relative positioning of the various components. The non-schematically depicted components in FIGS. 4-12 are drawn approximately to scale. However, the components may have other relative sizes, in other embodiments. It will be appreciated that if shown directly contacting each other, or directly coupled, then such elements may be referred to as directly contacting or directly coupled, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Still further in some examples, elements positioned coaxial or parallel to one another may be referred to as such.

The invention is further described in the following paragraphs. In one aspect, a multi-speed electric axle assembly is provided that comprises an electric machine rotationally coupled an input shaft, a first planetary gear set including: a ring gear meshed with a gear fixedly coupled to the input shaft; and a carrier that is rotationally coupled to a shaft; a first clutch configured to selectively ground a sun gear in the first planetary gear set; and a second clutch configured to selectively rotationally couple the sun gear in the first planetary gear set with the shaft. In one example, the first clutch may be a friction clutch. In another example, the second clutch may be a friction clutch. In one example, the shaft may be coupled to a differential via a second planetary gear set. In another example, the differential may be a limited slip differential. In yet another example, the second planetary gear set may be a simple planetary gear set. In another example, the first planetary gear set may be a simple planetary gear set. In another example, the multi-speed electric axle assembly may further comprise a jumper shaft rotationally coupled to the shaft and extending across a side of the electric machine. Further in one example, the multi-speed electric beam axle may be a rear axle. Further, in one example, the first clutch and the second clutch may be coaxially arranged. In another example, the differential may be an open differential.

In another aspect, a multi-speed electric beam axle is provided that comprises a traction motor rotationally coupled an input shaft; a simple planetary gear set including: a ring gear meshed with a gear fixedly coupled to the input shaft; and a carrier that is rotationally coupled to a shaft; a first clutch configured to selectively ground a sun gear in the first planetary gear set; a second clutch configured to selectively rotationally couple the sun gear in the first planetary gear set with the shaft; and a jumper shaft rotationally coupled to the shaft and extending across a side of the electric machine. In one example, the multi-speed electric beam axle is a rear axle. In one example, the differential may be a mechanical limited slip differential. In one example, the multi-speed electric beam axle may further comprise a final drive planetary gear set rotationally coupled to the jumper shaft and the differential. In yet another example, the final drive planetary gear set may be a simple planetary gear set. In another example, the first clutch and the second clutch may be coaxially arranged and are friction clutches. In another example, the first clutch and the second clutch may be positioned axially outboard of the simple planetary gear set. In another example, the first clutch and the second clutch may be positioned axially inboard of the simple planetary gear set. In another example, the multi-speed electric beam axle is positioned vertically under an exhaust conduit of an internal combustion engine.

Note that the example control and estimation routines included herein can be used with various powertrain, transmission, and/or vehicle system configurations. The control methods and routines disclosed herein may be stored as executable instructions in non-transitory memory and may be carried out by the control system including the controller in combination with the various sensors, actuators, and other vehicle hardware. Further, the described actions, operations and/or functions may graphically represent code to be programmed into non-transitory memory of the computer readable storage medium in the vehicle control, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and internal combustion engines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed electric beam axle, comprising:
a traction motor rotationally coupled to an input shaft;
a simple planetary gear set including:
a ring gear meshed with a gear fixedly coupled to the input shaft; and
a carrier that is rotationally coupled to a shaft;
a first clutch configured to selectively ground a sun gear in the simple planetary gear set;
a second clutch configured to selectively rotationally couple the sun gear in the simple planetary gear set with the shaft;
a jumper shaft rotationally coupled to the shaft and extending across a side of the electric machine; and
a mechanical limited slip differential coupled to the jumper shaft via a second simple planetary gear set;
wherein the multi-speed electric beam axle is a rear axle.

2. The multi-speed electric beam axle of claim 1, wherein the second simple planetary gear set is coupled to the differential.

3. The multi-speed electric beam axle of claim 2, wherein the traction motor is a motor-generator.

4. The multi-speed electric beam axle of claim 1, wherein the first clutch and the second clutch are coaxially arranged and are friction clutches.

5. The multi-speed electric beam axle of claim 4, wherein the first clutch and the second clutch are positioned axially outboard of the simple planetary gear set.

6. The multi-speed electric beam axle of claim 4, wherein the first clutch and the second clutch are positioned axially inboard of the simple planetary gear set.

7. The multi-speed electric beam axle of claim 1, wherein the multi-speed electric beam axle is positioned vertically under an exhaust conduit of an internal combustion engine.

* * * * *